Dec. 27, 1949   L. HIMMEL   2,492,150

ELECTRICAL TESTING SYSTEM

Filed Aug. 21, 1945

INVENTOR.
LEON HIMMEL
BY
ATTORNEY

Patented Dec. 27, 1949

2,492,150

UNITED STATES PATENT OFFICE 2,492,150

ELECTRICAL TESTING SYSTEM

Leon Himmel, Bronx, N. Y., assignor to Federal Telephone and Radio Corporation, New York, N. Y., a corporation of Delaware Application August 21, 1945, Serial No. 611,888

3 Claims. (Cl. 175—183)

My invention relates to electrical testing systems, particularly to means for measuring characteristics such as impedances of electrical equipment. My invention relates, by way of example, to means for measuring the electrical length of transmission lines.

Heretofore, the length of a transmission line or cable, measured in terms of the wave length of the high frequency energy passed along the line, has been determined by locating loops and nodes of standing waves on the line with a voltmeter. The probe of the meter is moved along the line and the maxima and minima points noted, and then the distances measured with a scale. Besides the electrical disadvantage of touching a high frequency line with a probe, the equipment must be portable and the method is cumbersome, slow and not adapted for rapidly testing cables and lines as in the factory.

An object of my invention is improved means for measuring circuit impedances.

More specifically, an object of my invention is a transmission line tester that is stationary and is accurate yet easy to operate and adapted for the rapid testing required in the manufacture of the lines.

My new test system comprises, essentially, a tunable calibrated impedance connected across the input end of the transmission line or similar equipment under test, the impedance being tunable to obtain parallel resonance with the impedance of the line under test.

A stable fixed frequency generator is connected to said input end, and through a resonant line a voltmeter is connected to the resonant line at a quarter wave point from said input end to show when parallel resonance is obtained. Hence, the tunable impedance may be calibrated in terms of wave length of the line under test. Alternatively or in addition, the calibration may be in terms of reactance to facilitate attachment of properly matched couplings at the ends of the line.

Figure 1:
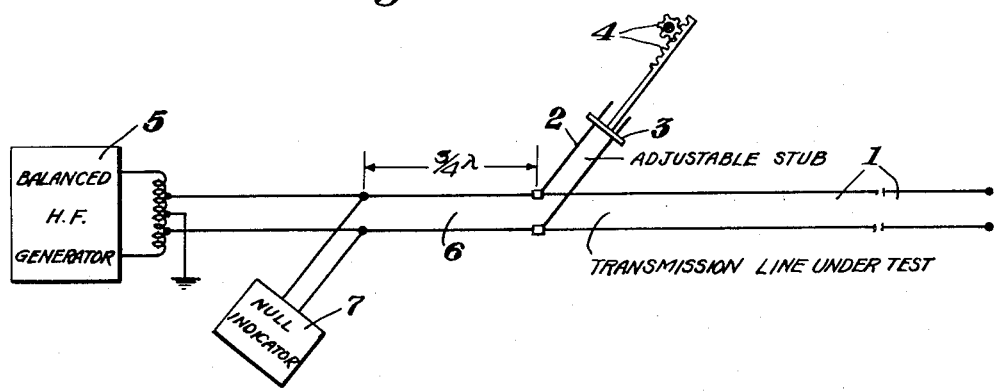
Figure 2:
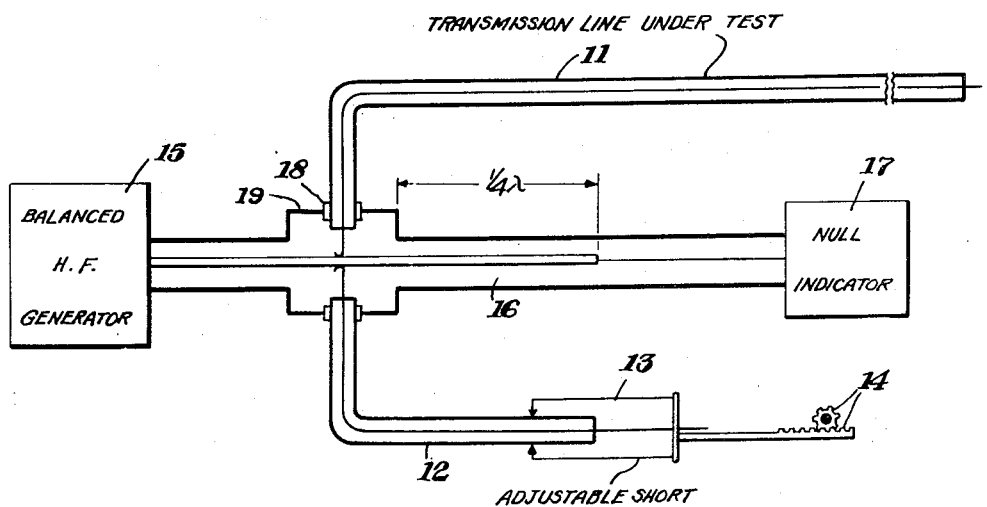

My invention, however, is defined with particularity in the appended claims and preferred embodiments thereof are described in the following specification and shown in the accompanying drawing in which:

Fig. 1 diagrammatically shows my improved test system applied to an open two wire transmission line, and Fig. 2 diagrammatically shows my improved test system applied to a coaxial cable.

A transmission line to be tested is shown at 1 in Fig. 1, and may comprise, for example, two open wires with air insulation, and having any desired characteristic impedance and attenuation constant. The line illustrated is open ended, and it is desired to precisely determine the length of the line in terms of wave length λ or in terms of impedance Z. An adjustable impedance 2, conveniently a stub or tunable line with a short-circuiting bar 3 slidable along the line with a rack and pinion 4, is connected across the input end of the line under test. The length of the stub is adjustable over a range, say, from ¼λ to ¾λ and hence is adjustable to give parallel resonance with any length of line under test. That is, to a voltage wave of length λ fed into the input end of line 1, the apparent impedance at the input end may be adjusted to a maximum, regardless of the magnitude and sign of the reactances of the stub and of the line.

The wave is supplied by a stabilized constant frequency generator 5 connected to the input end of line 1 by a resonant line 6, the output of the generator and the two wires of the line preferably being balanced with respect to ground. A voltmeter 7 is connected across the resonant line at a point an odd number of quarter wave lengths from the input end, when line 1 is open ended. Three quarter (¾) λ is a convenient spacing for ultra-high frequencies. When the outer end, opposite the input or generator end, of a line with distributed inductance and capacity is open circuited, the voltage distribution along the line is such that the voltage falls to minima at points odd numbers of quarter wave lengths from the outer end. The output end of resonant line 6 is connected to the combined input ends of lines 1 and 2, and at parallel resonance of line 1 and 2 a high impedance load is presented to the line 6. Assume the line 1, under test, is slightly longer than a quarter wave length, either odd or even numbered, and the sliding bar 3 is adjusted to a position on line 2 slightly less than a quarter wave. The resulting null or minimum indication of voltmeter 7 then accurately shows when the correct position of the bar is reached. The displacement of the bar from a quarter wave position on line 2, is a direct measure of the length of the line under test in terms of wave length λ. If desired, the amplitude of the voltage minima, which are proportional to the losses of the line, may be calibrated on the voltmeter scale.

My novel tester may be applied equally well to transmission cables of the coaxial type. The cable 11 to be tested is paralleled at its input end by a coaxial short (line 12), adjustable preferably by a rack and pinion 14 similar to 4 in Fig. 1, and calibrated in terms of wave length λ. Line 12 is made approximately equal to line 11 in length so as to match the loss in line 11 in addition to its reactance. Generator 15 feeds waves of length λ to the input ends of the parallel cables 11 and 12. A resonant line 16, an odd number of quarter wave lengths long, is also connected across the cable inputs. As in Fig. 1, the impedance of the adjustable short is made to obtain parallel resonance with the line under test and the resulting resistance maximum is evidenced by a voltage minimum at the voltmeter end of the quarter wave resonant line 16, and the length of the shorted line is an indication of the transmission line. For easy connection of cables to be tested to the test equipment, a threaded collar or other means 18 may be used for mechanically and electrically clamping the cable to the box 19. A similar clamping collar may be employed at the box end of the other cables for easy replacement of equipment.

While my novel tester has been described in connection with open ended transmission lines, it is apparent that it is also applicable to lines short-circuited at their outer ends. The standing waves in the latter case are shifted 90 degrees and the circuits attached to the input end of the line.

My improved tester is simple in construction, is easy to operate, and is adapted for fast, and accurate measurements of electrical characteristics of transmission lines.

I claim:

1. A system for testing the electrical length of a transmission line comprising distributed circuit parameter impedance means connected across one end of said line, said impedance means being adjustable to obtain, with the impedance of said line, resonance at a predetermined frequency, a generator of said frequency with connections for feeding current into said one end of said line, voltmeter means connected at an odd number of quarter wave lengths away from said end for indicating voltage minima, and means for showing the value and sign of the adjustable impedance.

2. A system for testing the electrical length of a transmission line comprising a distributed parameter impedance connected across the input end of said line having a shorting bar, said shorting bar being slidable to obtain parallel resonance with the impedance of the line under test, a generator connected to said input end of said line, a voltmeter, and a resonant line an odd number of quarter wave lengths long connected between said voltmeter and said input end.

3. A high frequency test system comprising terminals for connecting to the circuit to be tested, a high frequency wave generator connected to said terminals, a first distributed parameter resonant line connected to said terminals, adjustable means for short-circuiting said first line, a voltage null indicator, a second distributed parameter resonant line an odd number of quarter wave lengths long, said second line being connected between said indicator and said terminals.

LEON HIMMEL.

REFERENCES CITED

The following references are of record in the file of this patent:

UNITED STATES PATENTS

| Number | Name | Date |
| --- | --- | --- |
| 1,971,310 | Barber | Aug. 21, 1934 |
| 2,135,017 | Sharland | Nov. 1, 1938 |
| 2,358,462 | Mahren | Sept. 19, 1944 |

OTHER REFERENCES

Radio World, July 1936, pages 45–51.

Meagher et al.: Practical Analysis of Ultra High Frequency; R. C. A. Service Co., Inc., Aug. 1943, 2nd edition; pages 4–7.